(12) United States Patent
Chu et al.

(10) Patent No.: US 11,887,394 B2
(45) Date of Patent: Jan. 30, 2024

(54) IMAGE ANALYSIS TO MINE DOCUMENT INFORMATION

(71) Applicant: Capital One Services, LLC, McLean, VA (US)

(72) Inventors: Jennifer Chu, San Francisco, CA (US); Jonatan Yucra Rodriguez, San Francisco, CA (US); Alexander Golovanov, Lafayette, CA (US)

(73) Assignee: Capital One Services, LLC, McLean, VA (US)

( * ) Notice: Subject to any disclaimer, the term of this patent is extended or adjusted under 35 U.S.C. 154(b) by 381 days.

(21) Appl. No.: 17/239,821

(22) Filed: Apr. 26, 2021

(65) Prior Publication Data

US 2022/0343097 A1 Oct. 27, 2022

(51) Int. Cl.
*G06T 7/60* (2017.01)
*G06V 30/413* (2022.01)
(Continued)

(52) U.S. Cl.
CPC ............ *G06V 30/413* (2022.01); *G06F 18/21* (2023.01); *G06F 40/20* (2020.01); *G06N 20/00* (2019.01);
(Continued)

(58) Field of Classification Search
CPC . G06T 7/11; G06T 7/194; G06T 7/136; G06T 2207/20081; G06T 2207/20021; G06T 2207/30176; G06T 7/13; G06T 2207/10016; G06T 2207/20084; G06T 7/187; G06T 2207/20132; G06N 3/045; G06N 3/08; G06N 3/048; G06N 3/049; G06N 3/063; G06N 5/01; G06N 20/10; G06N 20/20; G06N 3/084; G06N 3/044; G06V 30/10; G06V 30/224; G06V 30/153; G06V 10/17; G06V 10/82; G06V 30/414; G06K 19/06037; G06K 19/14; G06K 19/06178; G06K 7/1413; G06K 7/1417; G06K 7/1439; G06K 7/146; G06Q 20/20; G06Q 20/3276; G06Q 30/06; G06Q 20/3274; G06Q 20/12; G07F 7/0886
See application file for complete search history.

(56) References Cited

U.S. PATENT DOCUMENTS 7,783,515 B1 8/2010 Kumar et al.
8,515,836 B1 8/2013 Keld
(Continued)

FOREIGN PATENT DOCUMENTS

KR 20200054375 A * 11/2018

OTHER PUBLICATIONS

Nov. 20, 2020, MrReceipt.com, https://mrreceipt.com/.

*Primary Examiner* — Quan M Hua
(74) *Attorney, Agent, or Firm* — Banner & Witcoff, Ltd.

(57) ABSTRACT

The present disclosure describes image analysis techniques that identify the source of a document. Once the source of the document is determined, the image analysis may locate one or more anchor fields in the document. The anchor fields may identify one or more additional fields that contain time-sensitive data and/or information. The image analysis performed herein may identify the time-sensitive data and/or information and process the data and/or information to schedule due dates and reminders.

20 Claims, 8 Drawing Sheets

(51) Int. Cl.
    *G06F 40/20*           (2020.01)
    *G06Q 30/04*          (2012.01)
    *G06N 20/00*          (2019.01)
    *G06V 10/40*          (2022.01)
    *G06V 30/412*        (2022.01)
    *G06F 18/21*          (2023.01)
    *G01S 19/42*          (2010.01)
    *G06V 30/10*          (2022.01)

(52) U.S. Cl.
    CPC .............. *G06Q 30/04* (2013.01); *G06V 10/40* (2022.01); *G06V 30/412* (2022.01); *G01S 19/42* (2013.01); *G06V 30/10* (2022.01)

(56) References Cited

U.S. PATENT DOCUMENTS

| | | | |
|---|---|---|---|
| 8,612,317 | B1 | 12/2013 | Harman et al. |
| 9,449,347 | B2 | 9/2016 | Schloter et al. |
| 10,489,756 | B2 | 11/2019 | Britt |
| 2021/0365836 | A1* | 11/2021 | Wilkins ............. G02B 27/0172 |
| 2023/0298063 | A1* | 9/2023 | Clarke ............... G06Q 30/0219 |
| | | | 705/14.24 |

* cited by examiner

100

IMAGE ANALYSIS TO MINE DOCUMENT INFORMATION

FIELD OF USE

Aspects of the disclosure relate generally to image analysis and more specifically to mining information contained in a document using image analysis.

BACKGROUND

Image processing techniques have difficulty processing documents. In addition to failing to recognize words and characters, image processing techniques fail to identify key fields of information. This may consume additional processing resources (e.g., CPU cycles, processing time, etc.) to recognize the key fields of information. In some instances, identifying the key fields may require human intervention.

SUMMARY

The following presents a simplified summary of various features described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

The image analysis techniques described herein may improve the speed and accuracy with which computing devices recognize key information in documents, thereby reducing the amount of processing resources (e.g., CPU cycles, processing time, etc.) needed to identify the key fields. Methods, devices, systems, and/or computer-readable media described herein may recognize an anchor field that offsets key information contained in a document. To recognize the anchor field, a machine learning model may be trained to recognize a source of the document. Upon determining the source of the document, one or more fields and, in particular, one or more anchor fields may be identified. The one or more anchor fields may then be used to locate additional information within the document. The additional information may be important and/or time-sensitive. Thus, locating the one or more anchor fields, and any additional fields that may be closely tied to the anchor field, the techniques described herein may reduce the processing power needed to identify important information.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description, reference is made to the accompanying drawings, which form a part hereof, and in which are shown various examples of features of the disclosure and/or of how the disclosure may be practiced. It is to be understood that other features may be utilized and structural and functional modifications may be made without departing from the scope of the present disclosure. The disclosure may be practiced or carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, features discussed herein may relate to methods, devices, systems, and/or computer-readable media for improving image analysis techniques by locating an anchor field to identify important, relevant, and/or sensitive information in a document. The image analysis techniques described herein may identify a source of a document, for example, using a database or a machine learning model. Once the source of the document is recognized, one or more anchor fields may be identified. An anchor field may be a string of characters, an image, a logo, and/or some other type of indicia that appears on a document to flag data and/or information proximately located near the anchor field. After identifying the one or more anchor fields, one or more additional fields may be located. The one or more additional fields may be within a threshold distance of the one or more anchor fields. The one or more additional fields may comprise important, time-sensitive, and/or relevant data and/or information. The image analysis techniques may obtain (extract) information from the one or more additional fields and identify one or more actions based on the information obtained from the one or more additional fields. Not only does this ensure that a user does not miss the important, time-sensitive, and/or relevant data and/or information contained in the additional fields, but identifying the source of the document and the one or more anchor fields may reduce the processing power needed to extract important data and/or information from documents.

Figure 1:
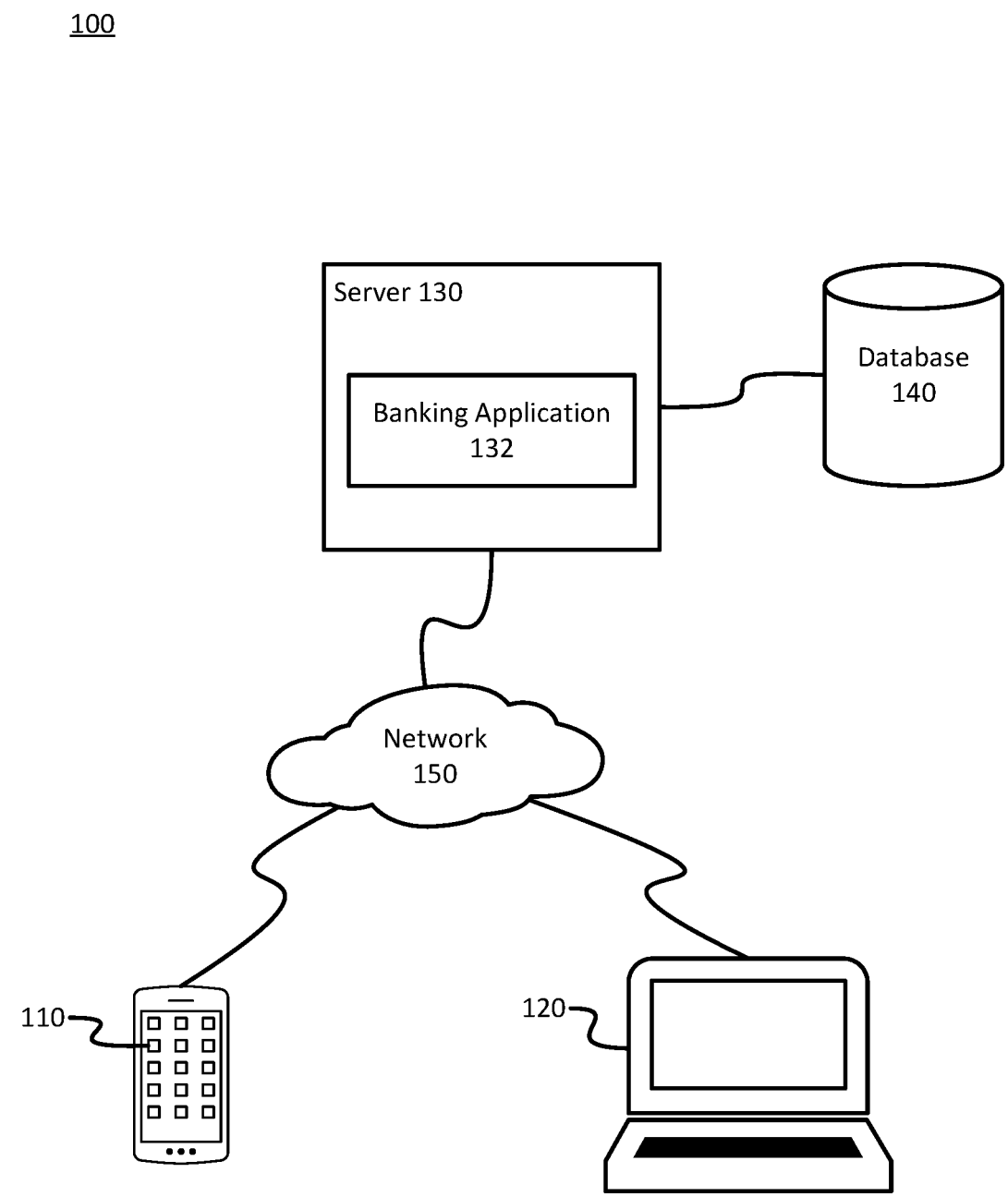
FIG. 1 shows an example of a system in which one or more features described herein may be implemented.

FIG. 1 shows an example of a system 100 that includes a first user device 110, a second user device 120, and a server 130, connected to a first database 140, interconnected via network 150.

First user device 110 may be a mobile device, such as a cellular phone, a mobile phone, a smart phone, a tablet, a laptop, or an equivalent thereof. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a banking application that provides access to the first user's banking information, as well as perform routine banking functions, such as checking the first user's balance, paying bills, transferring money between accounts, withdrawing money from an automated teller machine (ATM), and wire transfers. The banking application may comprise an authentication process to verify (e.g., authenticate) the identity of the first user prior to granting access to the banking information.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. These websites may include banking websites that allow the user to access his/her banking information and perform routine banking functions. In some embodiments, second user device 120 may include a banking application that allows the user to access his/her banking information and perform routine banking functions. The banking website and/or the banking application may comprise an authentication component to verify (e.g., authenticate) the identity of the second user prior to granting access to the banking information.

Server 130 may be any server capable of executing banking application 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Banking application 132 may be server-based software configured to provide users with access to their account information and perform routing banking functions. In some embodiments, banking application 132 may be the server-based software that corresponds to the client-based software executing on first user device 110 and second user device 120. Additionally, or alternatively, banking application 132 may provide users access to their account information through a website accessed by first user device 110 or second user device 120 via network 160. The banking application 132 may comprise an authentication module to verify users before granting access to their banking information.

First database 140 may be configured to store information on behalf of application 132. The information may include, but is not limited to, personal information, account information, and user-preferences. Personal information may include a user's name, address, phone number (i.e., mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. First database 140 may include, but are not limited to relational databases, hierarchical databases, distributed databases, in-memory databases, flat file databases, XML databases, NoSQL databases, graph databases, and/or a combination thereof.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
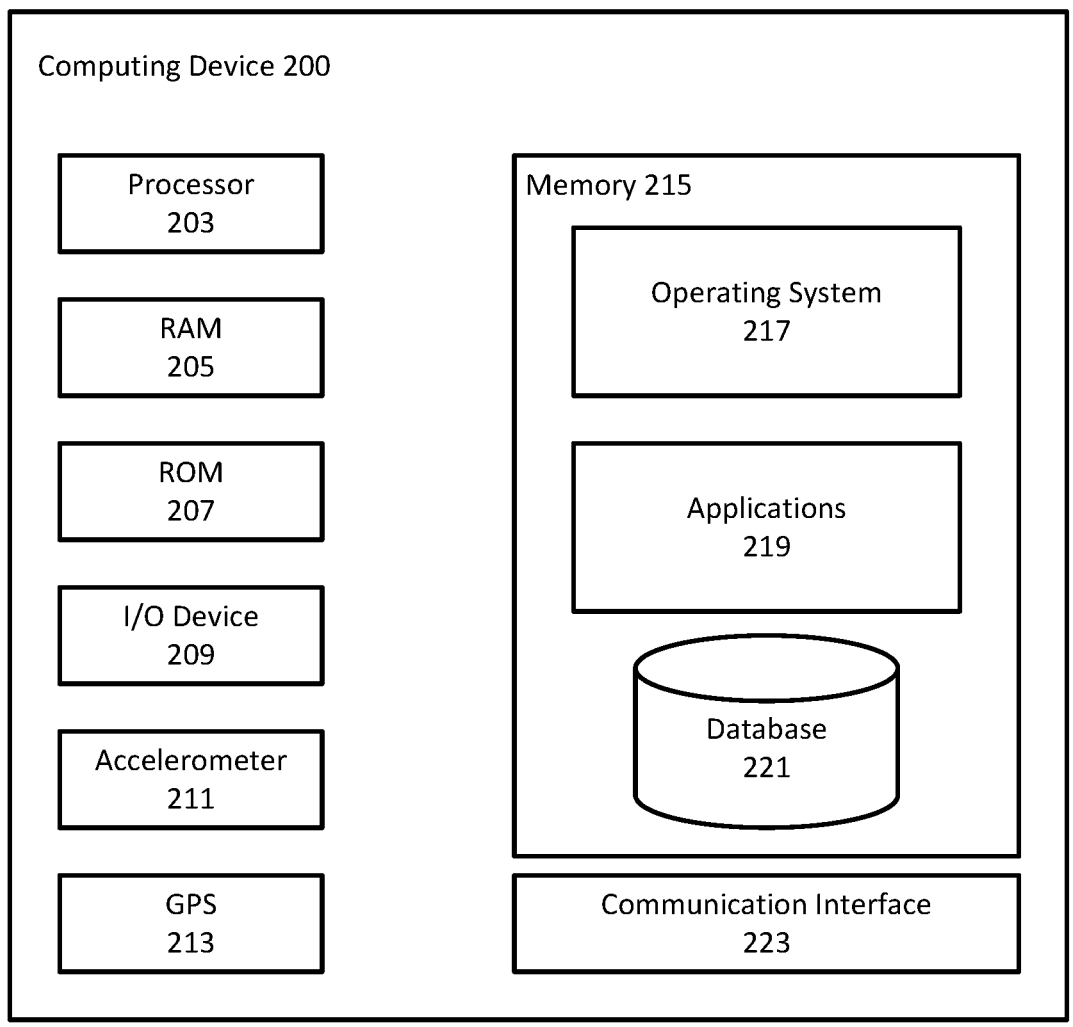
FIG. 2 shows an example computing device.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200. GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3:
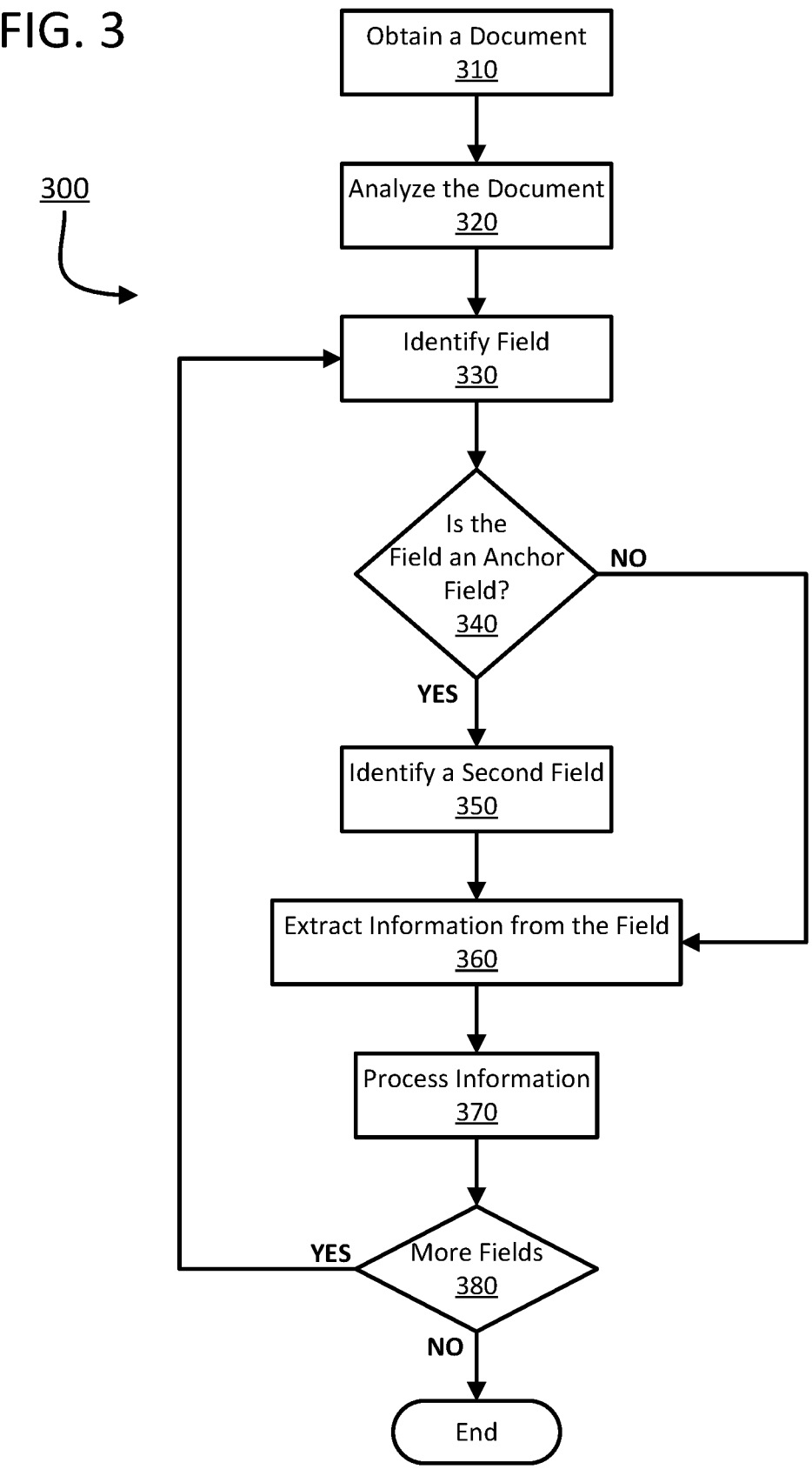
FIG. 3 shows an example of a process for analyzing a document according to one or more aspects of the disclosure.

As noted above, image analysis techniques may miss or misidentify important information when analyzing a document. The image analysis described herein locates one or more anchor fields and the important information associated therewith so important information is not missed and/or misidentified. FIG. 3 shows a flow chart of a process for analyzing a document according to one or more aspects of the disclosure. Some or all of the steps of process 300 may be performed using one or more computing devices as described herein, including, for example, the first user device 110, the second user device 120, the server 130, the computing device 200, or any combination thereof.

In step 310, a computing device (e.g., an application executing on the computing device) may obtain a document. The document may a receipt, a proof of purchase, an invoice, or any suitable document. To obtain the document, the computing device (e.g., the application executing on the computing device) may activate an image capture device (e.g., a camera) and capture an image of the document. Additionally or alternatively, the computing device (e.g., the application executing on the computing device) may import the document, for example, from a file (e.g., PDF), an email, or a text message. In step 320, the computing device (e.g., the application executing on the computing device) may analyze the document. The analysis performed by the computing device may be an automated analysis of the document, such as natural language processing (NLP), object character recognition (OCR), computer vision, or any suitable document analysis algorithm.

In step 330, the computing device (e.g., the application executing on the computing device) may identify a field of the document. In some examples, a first field indicating information about the document may be identified first. The first field may comprise a title of the document. Additionally or alternatively, the first field may identify a nature of the document. That is, the first field may identify whether the document is a receipt, a proof of purchase, an invoice, a court filing, a contract, etc. In examples where the document is a receipt, a proof of purchase, an invoice, the first field may identify a merchant, seller, business, restaurant, etc. The merchant, seller, business, restaurant, etc. may be determined from a logo, trademark, trade name, merchant name, or any other suitable merchant identifier. Once the merchant is identified, the merchant identifier (e.g., logo, trademark, trade name, merchant name, etc.) may be compared to a plurality of merchant identifiers stored in a database to determine a merchant associated with the merchant identifier. In some examples, a machine learning model may be trained to recognize different merchant documents and/or the fields contained therein. Additionally or alternatively, the computing device may send (e.g., transmit) the merchant identifier to a server. The server may comprise a database storing the plurality of merchant identifiers. The server may compare the received merchant identifier to the plurality of merchant identifiers and send an indication of the merchant to the computing device. Additionally or alternatively, the computing device (e.g., the application executing on the computing device) may use the indication of the merchant information to identify one or more fields of the document.

In step 340, the computing device (e.g., the application executing on the computing device) may determine whether an identified field comprises an anchor field. An anchor field may be a string of characters, an image, a logo, and/or some other type of identifying information that typically appears on a document to identify (flag) data and/or information proximately located near the anchor field. In some examples, the anchor field may be located in the same spot of a document. For example, an anchor field may comprise a corporate logo in the upper portion of a document. In another example, an anchor field may comprise a string of asterisks located at the bottom of a document. The anchor field may be identified using the analysis described above. That is, the anchor field may be identified using NLP, OCR, computer vision, or any suitable document analysis algorithm. Additionally or alternatively, the anchor field may be identified, for example, based on recognizing a source of the document. The source may be the merchant identifier described above. In this regard, the machine learning model may be trained to recognize anchor fields associated with different sources. For instance, certain pharmacies may use a string of asterisks or hashtag (pound) symbols at the bottom of their receipts to offset information. If the computing device determines that the field is not an anchor field, the method 300 proceeds to step 360 where information is extracted from the field. The information may comprise an item that was purchased, return information, warranty information, an offer (e.g., a rewards program, a coupon, a discount code, a survey, etc.), etc. The computing device (e.g., the application executing on the computing device) may process the information in step 370. Processing the information may comprise categorizing the type of purchase as part of an expense tracking functionality. Additionally, processing the information may comprise storing information associated with the field in a memory, such as a database. Additionally or alternatively, processing the information may comprise sending the information to a server and/or database for further processing. In step 380, the computing device (e.g., the application executing on the computing device) may determine whether any more fields are present in the document. If so, the method 300 returns to step 330 to identify and/or process the additional fields. If there are no additional fields, then the method 300 ends.

If, in step 340, the computing device identifies a field as an anchor field, the computing device (e.g., the application executing on the computing device) may proceed to step 350 to identify a second field. The second field may be located within a threshold distance of the anchor field. The threshold distance may comprise a predetermined number of pixels, a predetermined amount of space, or any other suitable offset. The second field may comprise time-sensitive information, such as an offer, a rebate, a coupon, a discount, a reward, a survey, an expiration date for the return of one or more items, warranty information for one or more items, etc. In some examples, the second field may comprise a machine-readable code, such as a barcode or a QR code. Like the non-anchor fields described above, information may be extracted from the second field in step 360. As noted above, the information extracted from the second field may comprise time-sensitive information or information associated with an expiry date. In step 370, the information extracted from the second field may be processed. As noted above, processing the information may include storing the information in a memory and/or a database. Additionally, processing the information may comprise calendaring an expiration date associated with the information contained in the second field and/or storing a merchant identifier associated with the information. Processing the information may also comprise storing information associated with the merchant. As will be discussed in greater detail below with respect to FIG. 7, the computing device (e.g., the application executing on the computing device) may send notifications (e.g., email reminders, push notifications, text messages, etc.) associated with the information, for example, based on the computing device being proximately located to the merchant and/or the expiry date approaching. Once the information associated with the second field has been processed, the method 300 may determine whether there are any more fields. If so, the method 300 returns to step 330. If not, the method 300 concludes.

By using the method described above to process a document, a computing device may identify a plurality of fields associated with a document, such as a receipt, a proof of purchase, an invoice, etc. One or more purchases may be extracted and categorized from the plurality of fields. The one or more purchases may be used to generate an expenditure report that may be used to identify a user's spending habits and/or help them budget. The expenditure report, which may include a category for each of the one or more purchases, may be displayed by one or more applications executing on the computing device to better visualize the user's spending habits and/or budget.

Figure 4:
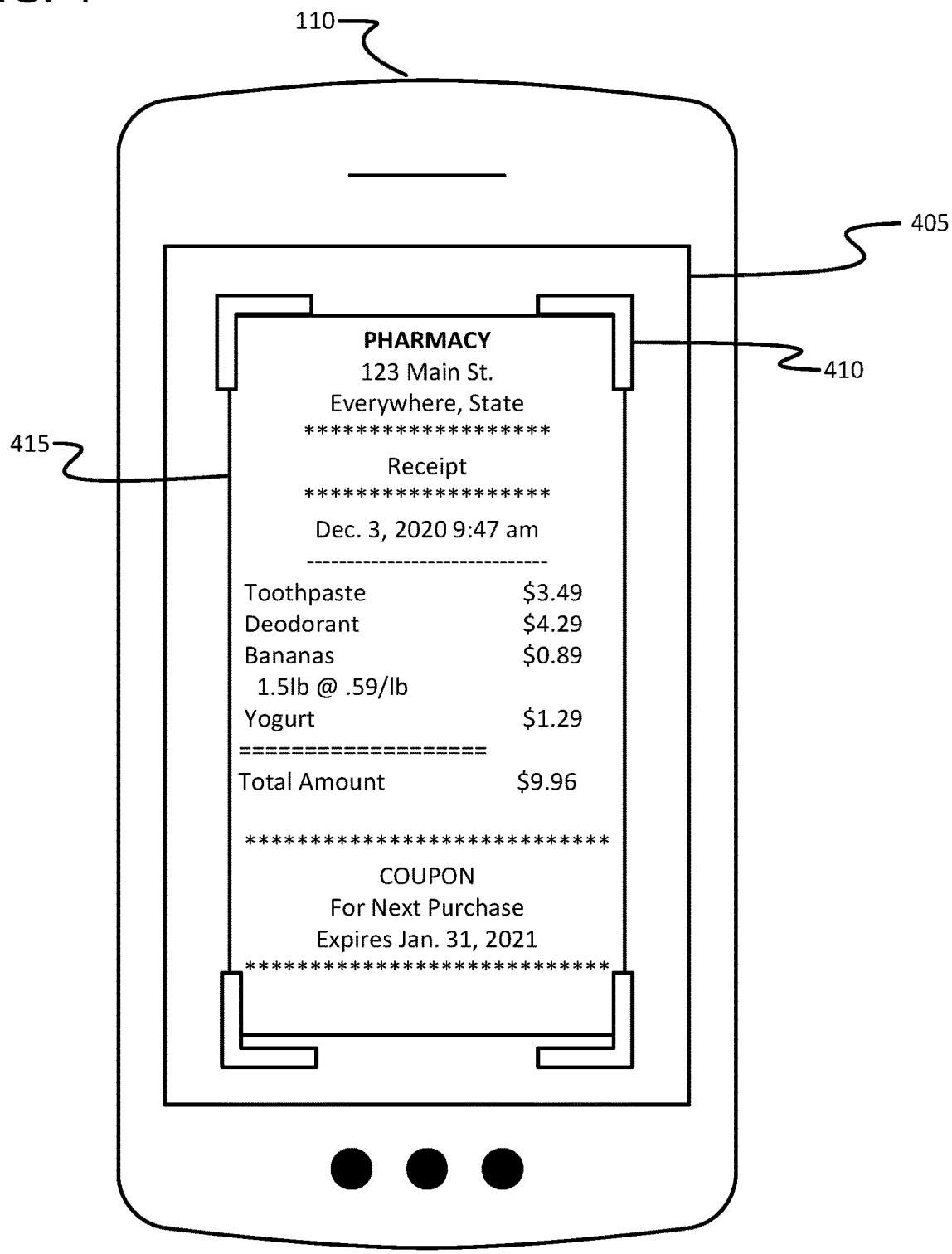
FIG. 4 shows an example of capturing the document in accordance with one or more aspects of the disclosure.

FIG. 4 shows an example of capturing the document in accordance with one or more aspects of the disclosure. FIG. 4 shows the first user device 110. The first user device 110 comprises a display 405. As shown in FIG. 4, the first user device 100 may activate an image capture device (not shown), for example, to obtain a copy of the document. The input from the image capture device may be output via the display 405. Additionally, the display 405 may overlay guidelines 410 to frame a document, such as document 415. As shown in FIG. 4, the document 415 is a receipt; however, it will be appreciated that the document 415 may be a proof of purchase, an invoice, a court filing, a contract, or an equivalent thereof. When the document 415 falls within the guidelines 410, the first user device 110 (e.g., the application executing on the first user device 110) may automatically capture an image of the document 415. Alternatively, a user may actuate one or more buttons to capture an image of the document 415, for example, when the document 415 falls within the guidelines 410. While a mobile device is shown in FIG. 4, it will be appreciated that any suitable device may be used. For example, an image capture device on a laptop computer may be used to capture an image of the document. Additionally or alternatively, a scanner may be used to capture an image of the document.

Figure 5:
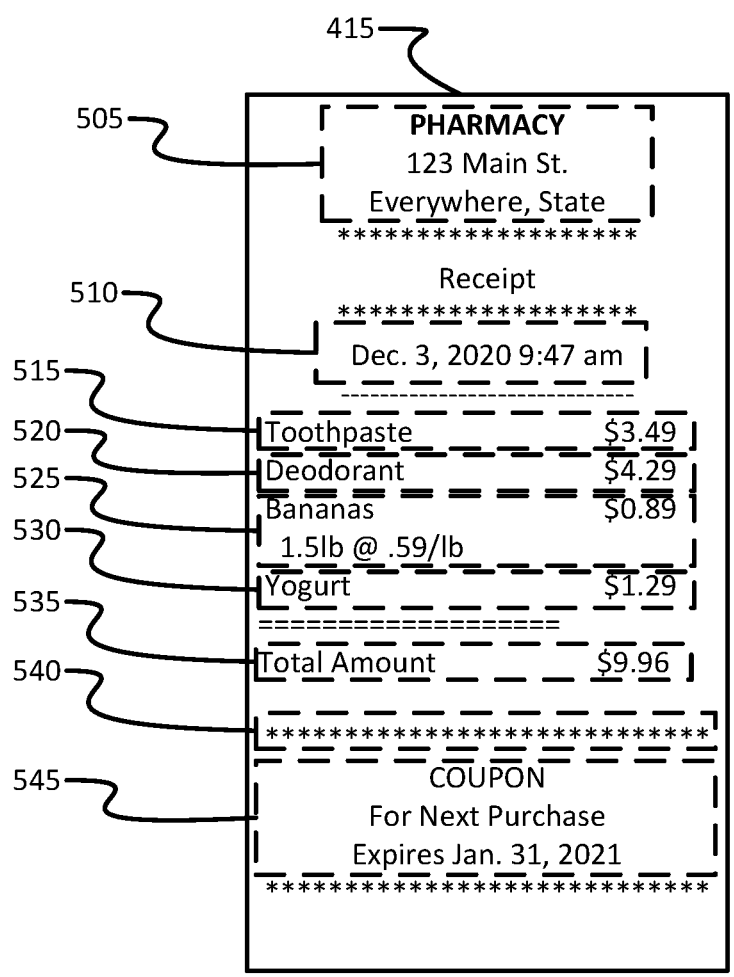
FIG. 5 shows an example of identifying fields in the document in accordance with one or more aspects of the disclosure.

Once an image of the document has been captured, the document may be analyzed to identify data and/or information contained in the document. FIG. 5 shows an example of identifying fields in the document in accordance with one or more aspects of the disclosure. In particular, FIG. 5, shows the document 415 that was captured in FIG. 4, above. While the document 415 is shown as a receipt from a pharmacy, it will be appreciated that the image analysis may be performed on any document.

In performing the image analysis, a computing device (e.g., the application executing on the computing device) may identify a first field 505. The first field 505 may identify a merchant, seller, business, restaurant, etc. As noted above, the merchant, seller, business, restaurant, etc. may be determined from at least one of a logo, trademark, trade name, merchant name, or any other suitable merchant identifier. The merchant identifier (e.g., logo, trademark, trade name, merchant name, etc.) may be compared to one or more entries in a database of merchant identifiers to determine a merchant associated with the merchant identifier. Additionally or alternatively, a machine learning model may be used to recognize the merchant associated with a merchant identifier.

Based on identifying the merchant, the computing device (e.g., the application executing on the computing device) may identify one or more fields associated with the document 415, for example, using the techniques (e.g., OCR, NLP, computer vision, machine learning, etc.) described above in FIG. 3. In this regard, the computing device (e.g., the application executing on the computing device) may receive an indication of at least one of: a quantity of fields associated with documents from the identified merchant, a location of the fields, the types of fields, how the merchant indicates its anchor fields, etc. The computing device (e.g., the application executing on the computing device) may receive information regarding the quantity of fields, the location of the field, the types of fields associated with documents from the identified merchant, the anchor field identifier, etc. from a database. The database may be stored locally on the computing device. Additionally or alternatively, the computing device (e.g., the application executing on the computing device) may receive the information about the fields of the document from a server. For example, the computing device may transmit the merchant name/identifier to a server. The transmission may comprise a database query that includes the merchant name/identifier. The server may respond with the information to help the computing device identify pertinent information associated with the document 415.

Using the information, the computing device (e.g., the application executing on the computing device) may identify additional fields. For example, the computing device (e.g., the application executing on the computing device) may identify a second field 510, which may indicate the date and/or time of the transaction. This information may be used, for example, by a financial institution (e.g., a bank, a credit card issuer, etc.) to verify and/or authenticate a transaction. Additionally, the computing device (e.g., the application executing on the computing device) may identify a plurality of products that were purchased in the third field 515, the fourth field 520, the fifth field 525, and the sixth field 530. As will be discussed in greater detail below with respect to FIGS. 6A and 6B, the identification of the products may be used to track a user's spending habits and/or budget the user's expenses. The seventh field 535 may comprise a total amount of the purchase Like the second field above (identifying the date and/or time of the transaction), the information of the seventh field 735 may be to verify and/or authenticate a transaction. That is, the seventh field 735 may be compared to a user's account to cross-check the transaction.

The computing device (e.g., the application executing on the computing device) may recognize the eighth field 540 as an anchor field. In this regard, the computing device (e.g., the application executing on the computing device) may recognize the eighth field 540 as a field. Upon recognizing that the eighth field 540 comprises a string of asterisks, the computing device (e.g., the application executing on the computing device) may determine that the eight field 540 comprises the anchor field. Based on a determination that the eight field 540 comprises the anchor field, the computing device (e.g., the application executing on the computing device) may locate the ninth field 545 within a predetermined distance of the eight field 540. As shown in FIG. 5, the ninth field 545 may be located within a predetermined number of pixels of the eight field 540. The computing device (e.g., the application executing on the computing device) may extract information from the ninth field 545. As noted above, the information extracted from the ninth field 545 may comprise time-sensitive information and/or information associated with an expiry date. As shown in FIG. 5, the ninth field 545 comprises a coupon that expires on Jan. 31, 2021. The coupon may be saved to the computing device, for example, in an application located on the computing device. The application may calendar the expiration date associated with the coupon. Additionally or alternatively, the application may send notifications (e.g., email reminders, push notifications, text messages, etc.) associated with the coupon, for example, based on the computing device being located in a geo-fence associated with the merchant and/or as the expiry date approaches.

Figure 6A:
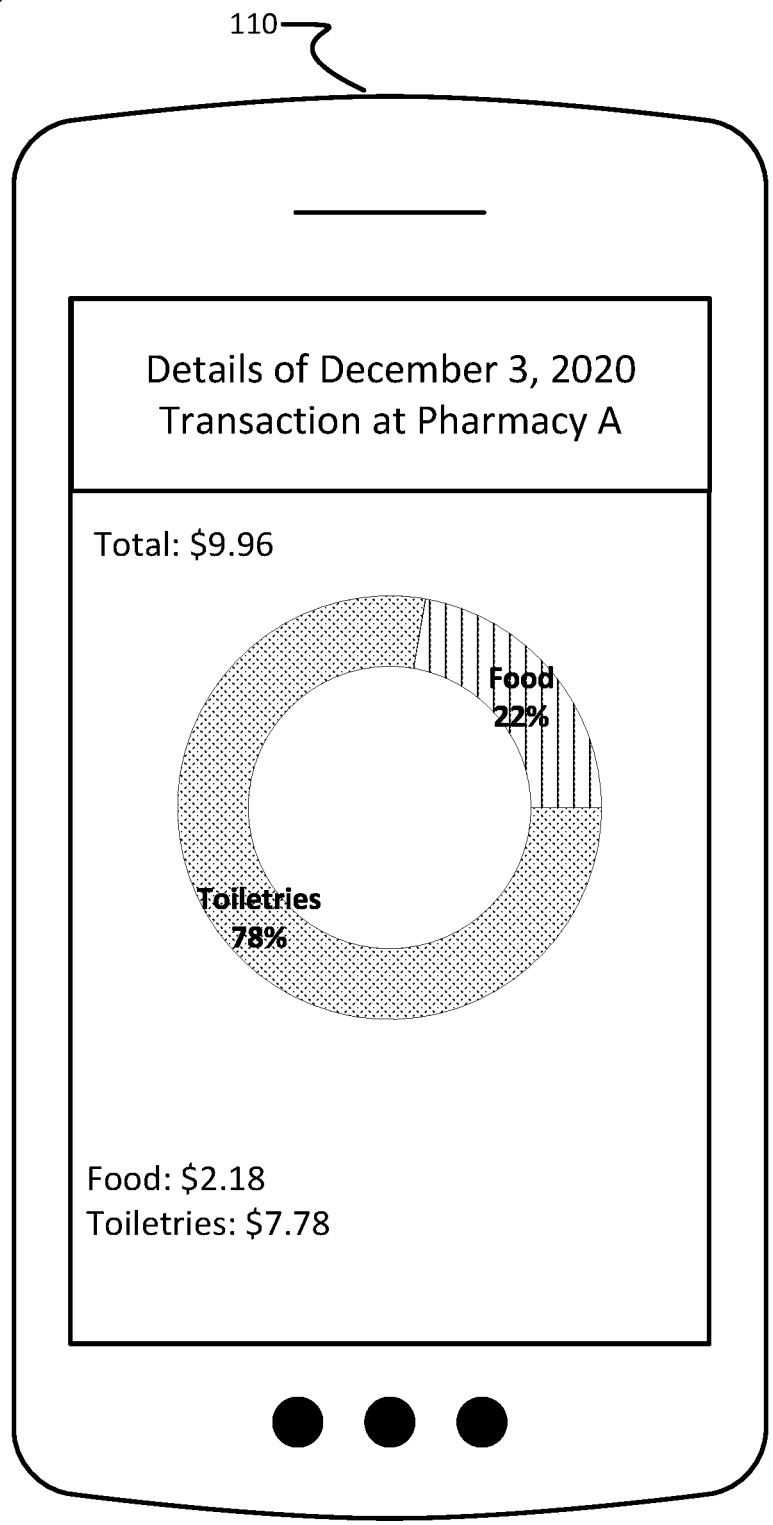
FIGS. 6A and 6B show an example of displaying information associated with the document according to one or more aspects of the disclosure.
Figure 6B:
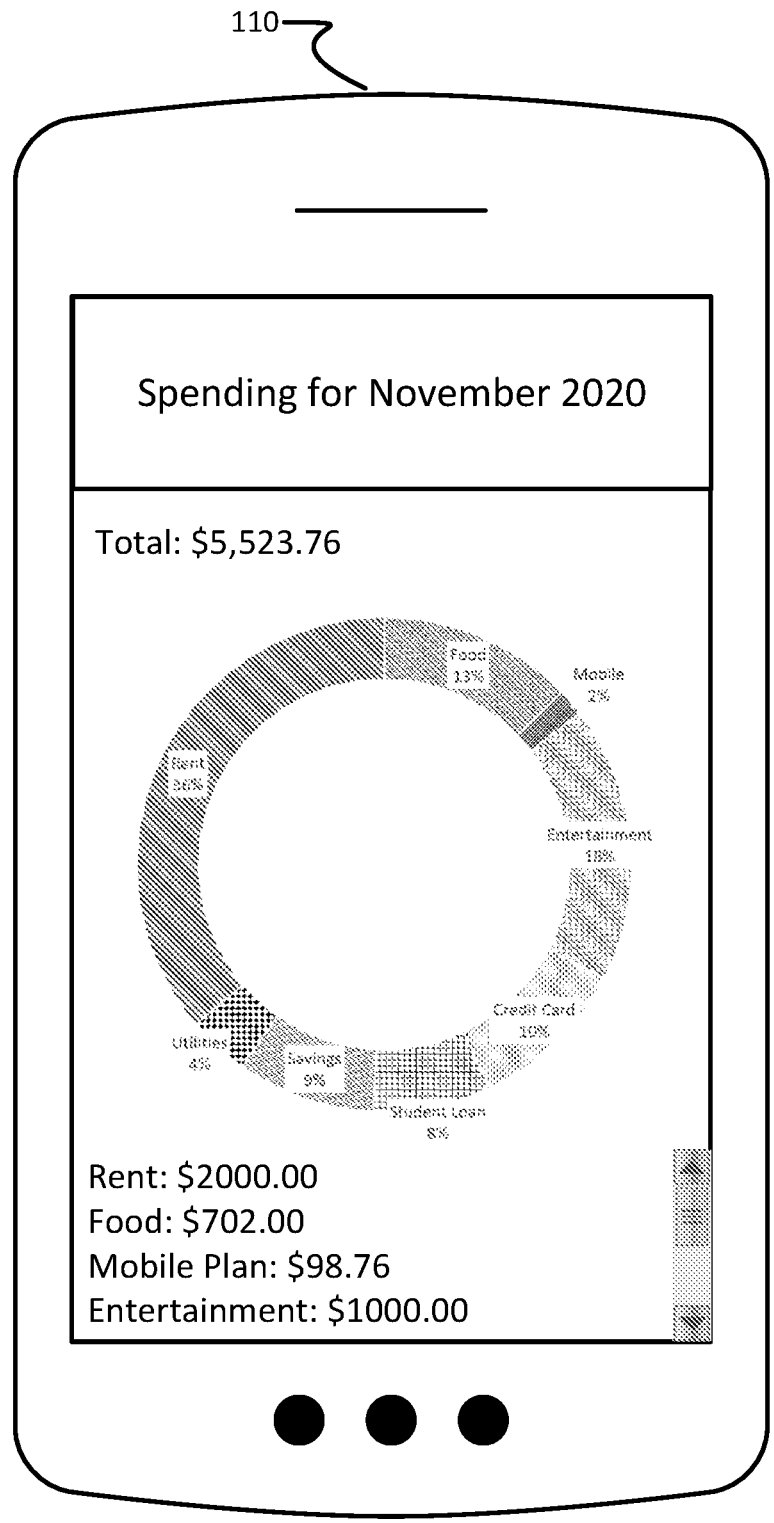

As noted above, the image analysis techniques described herein may be used to provide granular details regarding a user's spending habits. In this regard, scanning receipts, in addition to monitoring incoming and outgoing transactions associated with the user's account, a computing device (e.g., an application executing on the computing device) may provide insights into the user's spending habits to better help them budget. FIGS. 6A and 6B show an example of displaying information associated with the document according to one or more aspects of the disclosure. As noted above, the computing device (e.g., an application executing on the computing device) may identify a plurality of fields and extract information from the plurality of fields. Based on the extracted information, the information contained in each of the plurality of field may be categorized. The computing device may then generate an expenditure report that includes a category for each of the fields. The computing device may then output the expenditure report for the user to view.

FIG. 6A shows an expenditure report associated with the document 415 shown in FIGS. 4 and 5. In this regard, the computing device may recognize the good purchased in each of the respective fields of the document 415. That is, the computing device may recognize that the third field 515 corresponds to toothpaste, the fourth field 520 corresponds to deodorant, the fifth field 525 corresponds to bananas, and the fifth field 530 corresponds to yogurt. The computing device may categorize each of these expenses in respective categories. For example, the toothpaste and the deodorant may be categorized as necessities and/or toiletries, while the bananas and yogurt may be categorized as food. Additionally, the computing device may calculate a percentage of the total amount for each category. FIG. 6A shows an example of a breakdown of a single transaction. As shown in FIG. 6A, 22% of the total amount spent in the Dec. 3, 2020 transaction at Pharmacy A was spent on food, while the remaining 78% of the total amount spent went to toiletries. The itemized information shown in FIG. 6A may be used to determine a user's monthly (or yearly) spending habits.

FIG. 6B shows an example of an expenditure report showing a user's monthly spending. The information obtained from documents, such as receipts, invoices, etc., may provide more granular information about the user's spending habits. That is, the total amount spent at Pharmacy A on Dec. 3, 2020 is not solely allocated to necessities, for example, based on the purchase occurring at a pharmacy. Instead, the computing device (e.g., an application executing on computing device) may identify and itemize the information to better sort the purchases into categories. This may help the user identify their spending habits and better allocate (or re-allocate) their budget.

Figure 7:
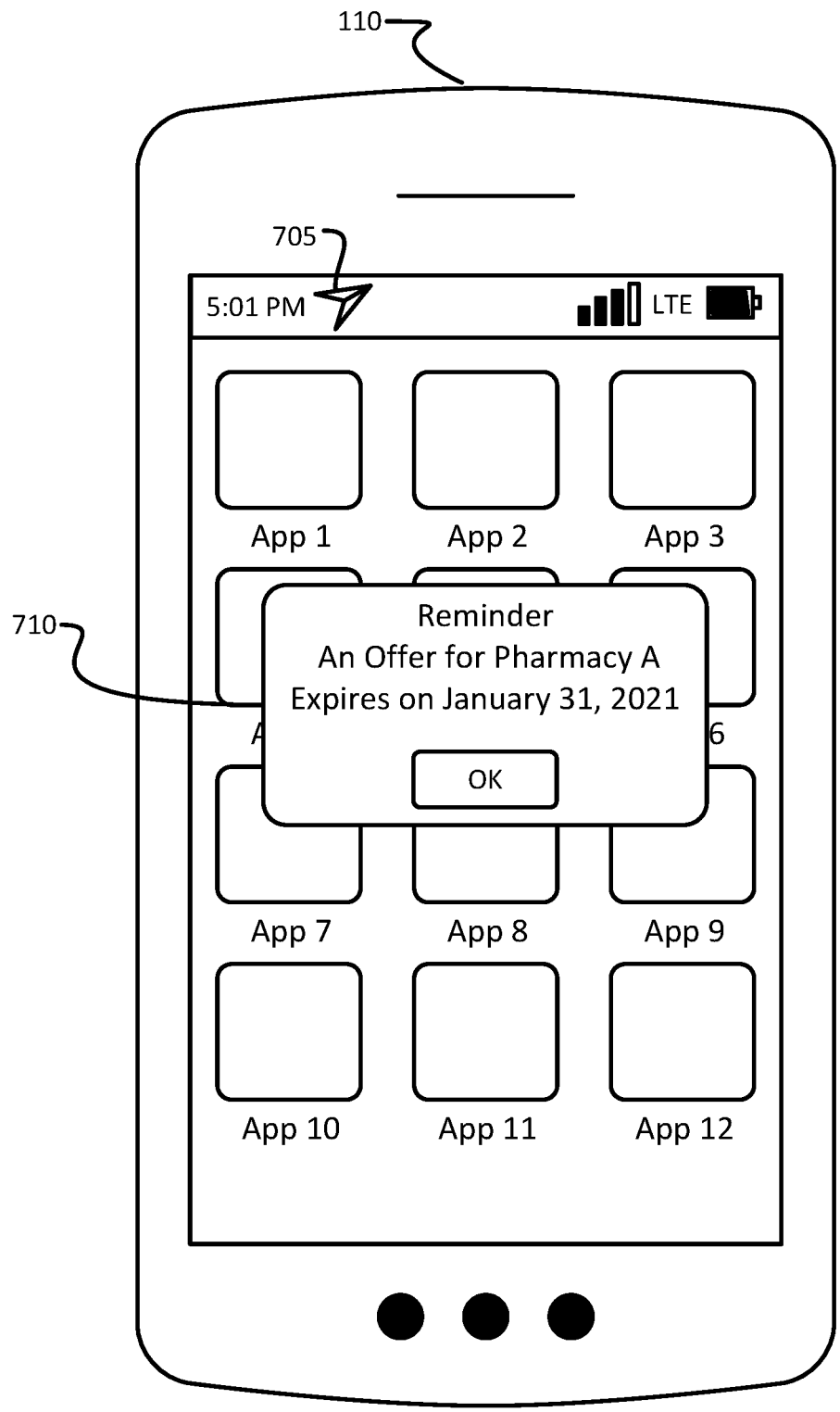
FIG. 7 shows an example of a notification associated with document information in accordance with one or more aspects of the disclosure.

In addition to providing insight into a user's spending habits, the computing device may use the information identified via the image analysis to store information and send reminders about the information. FIG. 7 shows an example of a notification associated with document information in accordance with one or more aspects of the disclosure. FIG. 7 shows an example of the first user device 110. The first user device 110 may comprise a radiodetermination mechanism as indicated by the location services icon 705. The radiodetermination mechanism may comprise a radio navigation unit and/or a radiolocation unit. The radiodetermination mechanism may comprise an antenna or another suitable transceiver configured to determine the location of the first user device 110. The antenna and/or transceiver may comprise a GPS receiver/antenna, such as GPS receiver/antenna 213, configured to receive one or more signals from one or more global positioning satellites to determine a geographic location of the first user device 110. For example, the first user device 110 (e.g., one or more antennas and/or the radiodetermination mechanism of the first user device 110) may receive one or more signals from one or more global positioning satellites. Based on the one or more received signals, the first user device 110 may calculate a geographic location of the first user device 110. The geographic location may be determined using trilateration and/or multilateration, for example, based on an angle of arrival of the one or more received signals, a time difference of arrival of the one or more received signals, and/or a location signature of the one or more received signals. In another example, the location of the first user device 110 may be determined using one or more beacons, such as an indoor positioning beacon or a BLE beacon. Similar to the example above, the first user device 110 may receive one or more signals from one or more beacons. The one or more signals may comprise location information associated with a beacon that transmitted the signal. The first user device 110 may then calculate a distance between the first user device 110 and the beacon based on the signal. Based on the distance between the first user device 110 and the beacon and the location information associated with each of the one or more beacons, the first user device 110 may determine a geographic location of the first user device 110. In further examples, the first user device 110 may use a combination of GPS signals and/or beacon signals to determine the location of the first user device 110.

Once the location is determined, the first user device 110 (e.g., an application executing on the first user device 110) may determine whether the location is associated with one or more merchants. For example, the first user device 110 may determine if the location is within a geo-fence associated with a merchant. If the first user device 110 is within the geo-fence, the first user device 110 may determine whether there are any offerings (e.g., coupons, specials, discounts, rebates, etc.) associated with the merchant. If there are offerings associated with the merchant, the first user device 110 may provide a notification 710 to a user regarding the offering. As shown in FIG. 7, the notification 710 may be a push notification associated with an application. Additionally or alternatively, the notification 710 may comprise a text message or an email notification. In some examples, the user of the first user device 110 may click on the notification 710, which may cause the offer to be displayed on the first user device 110. Additionally or alternatively, the user may open an application associated with the notification 710 to retrieve the offering.

In addition to providing notifications based on a location of the first user device 110, the first user device 110 may also provide notifications of expiring offers. As noted above, the first user device 110 (e.g., an application executing on first user device 110) may record an expiry date of one or more offerings. As the expiry date approaches, the first user device 110 (e.g., the application executing on the first user device 110) may provide notifications, such as notification 710, of the offering. In some examples, the location-based reminders and the time-based reminders may be provided together. For example, a notification, such as the notification 710, may be provided, for example, if the first user device 110 is located at the merchant and the offering is expiring soon (e.g., >2 weeks). As discussed above, the user may click (open) the notification 710 and present the offering, for example, based on the notification 710.

The above-described systems, devices, and methods may improve image analysis techniques by reducing the processing power needed to identify important data and/or information. Specifically, recognizing one or more anchor fields that offset key information contained in a document may improve the speed and/or accuracy with which image analysis techniques recognize important data and/or information. Additionally, using a machine learning model to recognize a source of the document may further aid in improving the accuracy of the identification of data and/or information contained in a document. Thus, the image analysis techniques described herein may reduce the amount of processing resources (e.g., CPU cycles, processing time, etc.) required to identify important data and/or information contained in scanned documents.

One or more features discussed herein may be embodied in computer-usable or readable data and/or computer-executable instructions, such as in one or more program modules, executed by one or more computers or other devices as described herein. Program modules may comprise routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more features discussed herein, and such data structures are contemplated within the scope of computer executable instructions and computer-usable data described herein. Various features described herein may be embodied as a method, a computing device, a system, and/or a computer program product.

Although the present disclosure has been described in terms of various examples, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Although examples are described above, features and/or steps of those examples may be combined, divided, omitted, rearranged, revised, and/or augmented in any desired manner. Thus, the present disclosure should be considered in all respects as illustrative and not restrictive. Accordingly, the scope of the disclosure should be determined not by the examples, but by the appended claims and their equivalents.

What is claimed is:

1. A method comprising:
   obtaining, by a computing device, a document;
   identifying, based on an automated analysis of the document, an anchor field;
   identifying, based on the automated analysis of the document, a second field based on the second field being within a threshold distance of the anchor field, wherein the second field comprises time-sensitive information;
   extracting and storing a plurality of details from the second field, wherein the plurality of details comprises an expiration date;
   determining, using a radiodetermination mechanism, a location of the computing device; and
   sending, based on a determination that the location of the computing device is associated with a merchant and based on a determination that the expiration date has not passed, a reminder of an offer associated with the time-sensitive information.

2. The method of claim 1, wherein the document comprises at least one of:
   a receipt;
   a proof of purchase; or
   an invoice.

3. The method of claim 1, wherein the obtaining the document comprises at least one of:
   capturing the document using an image capture device of the computing device;
   importing the document from an email account; or
   importing the document from a text message.

4. The method of claim 1, wherein the automated analysis of the document comprises at least one of natural language processing (NLP), object character recognition (OCR), or computer vision.

5. The method of claim 1, wherein the threshold distance comprises a predetermined number of pixels.

6. The method of claim 1, wherein the anchor field comprises a predetermined string of text.

7. The method of claim 1, wherein the second field comprises at least one of a barcode or a QR code.

8. The method of claim 1, wherein the offer comprises at least one of:
   a coupon;
   a special offer;
   a discount;
   a reward;
   a rebate; or
   a survey.

9. The method of claim 1, further comprising:
   identifying a plurality of fields;
   extracting one or more purchases from the plurality of fields;
   categorizing each of the one or more purchases;
   generating an expenditure report indicative of a user's spending habits, wherein the expenditure report comprises a category for each of the one or more purchases; and
   causing the expenditure report to be presented on the computing device.

10. A non-transitory computer-readable medium storing instructions that, when executed by one or more processors, cause the one or more processors to perform steps comprising:
    capturing, via an image capture device of a computing device, a document;
    identifying, based on an automated analysis of the document, one or more fields, wherein at least one of the fields comprises a merchant identifier;
    identifying a first field, of the one or more fields, as an anchor;
    identifying a second field based on the second field being within a threshold distance of the anchor;
    extracting a plurality of details from the second field;
    storing the plurality of details, wherein the plurality of details comprises time-sensitive information;
    determining, using a radiodetermination mechanism, a location of the computing device; and
    sending, based on a determination that the location of the computing device is associated with the merchant identifier and based on a determination that the time-sensitive information has not expired, a reminder of an offer associated with the time-sensitive information.

11. The non-transitory computer-readable medium of claim 10, wherein the instructions, when executed by the one or more processors, cause the one or more processors to perform steps comprising:
    comparing the merchant identifier to a plurality of merchant identifiers stored in a database to determine a merchant associated with the merchant identifier.

12. The non-transitory computer-readable medium of claim 10, wherein the instructions, when executed by the one or more processors, cause the one or more processors to perform steps comprising:
    transmitting the merchant identifier to a server, wherein the server comprises a database storing a plurality of merchant identifiers; and
    receiving, from the server, an indication of a merchant associated with the merchant identifier.

13. The non-transitory computer-readable medium of claim 10, wherein the reminder comprises at least one of: a text message, a push notification via a mobile app, or an email.

14. The non-transitory computer-readable medium of claim 10, wherein the instructions, when executed by the one or more processors, cause the one or more processors to perform steps comprising:
    opening, based on the reminder of the offer, a mobile application on the computing device; and
    causing the offer to be presented on the computing device.

15. A computing device comprising:
    one or more processors; and
    memory storing instructions that, when executed by the one or more processors, cause the computing device to:

obtain a document;

identify, based on an automated analysis of the document, an anchor field;

identify, based on the automated analysis of the document, a second field based on the second field being within a threshold distance of the anchor field, wherein the second field comprises time-sensitive information;

extract and store a plurality of details from the second field, wherein the plurality of details comprises an expiration date associated with the time-sensitive information;

determine, using a radiodetermination mechanism, a location of the computing device; and send, based on a determination that the location of the computing device is associated with a merchant and based on a determination that the time-sensitive information has not expired, a reminder of an offer associated with the time-sensitive information.

16. The computing device of claim 15, wherein the second field comprises at least one of a barcode or a QR code.

17. The computing device of claim 15, wherein the threshold distance comprises a predetermined number of pixels.

18. The computing device of claim 16, wherein the instructions, when executed by the one or more processors, cause the computing device to:

train a machine learning model to recognize a plurality of documents, wherein each of the plurality of documents is associated with a merchant; and use the machine learning model to further identify the anchor field and the second field.

19. The computing device of claim 18, wherein the plurailty of documents comprises at least one of:

a receipt;

a proof of purchase; or an invoice.

20. The computing device of claim 16, wherein the instructions, when executed by the one or more processors, cause the computing device to:

identify a plurality of fields;

extract one or more purchases from the plurality of fields;

categorize each of the one or more purchases;

generate an expenditure report indicative of a user's spending habits, wherein the expenditure report comprises a category for each of the one or more purchases; and cause the expenditure report to be presented on the computing device.

* * * * *